ate. However, an amount of N,N-disubstituted carbamyl chloride sufficient to add from about 10 to 100 parts hydrolyzable chlorine per million of the organic isocyanate is usually sufficient to provide a significant or desired improvement in reactivity with reactive hydrogen atoms.
United States Patent Office 3,640,886
Patented Feb. 8, 1972

3,640,886
TOLUENE DIISOCYANATE COMPOSITIONS
Moses Cenker, Trenton, Mich., assignor to BASF Wyandotte Corporation, Wyandotte, Mich.
No Drawing. Filed Sept. 25, 1968, Ser. No. 762,629
Int. Cl. C07c *119/04*
U.S. Cl. 252—182
6 Claims

ABSTRACT OF THE DISCLOSURE

A method of increasing the reactivity of organic isocyanates containing hydrolyzable chlorides which comprises mixing with the organic isocyanate a small amount of N,N-disubstituted carbamyl chloride.

---

Organic polyisocyanates are reacted with organic compounds having groups containing reactive hydrogen atoms in the preparation of a polyurethane plastic. One of the common contaminants found in such isocyanates is the relatively strongly acidic carbamyl chloride which is formed as the result of the reaction of a primary amino group and phosgene in the preparation of the organic isocyanate. This results in the presence of hydrolyzable chlorine as determined by ASTM Method D–1638–67T, Sections 39–46 described under the heading "Hydrolyzable Chlorine." For some applications, particularly the preparation of one-shot polyurethanes, these polyisocyanates are not as reactive as would be desired by those skilled in the art.

Accordingly, it is a purpose of the instant invention to provide an improved method for increasing the reactivity of organic isocyanates containing hydrolyzable chloride and, to be more specific, increasing the reaction rate of organic polyisocyanates with organic compounds having reactive hydrogen atoms for the "one-shot" method of preparing polyurethanes wherein enhanced reactivity is desired.

This invention is based on the surprising discovery that the reactivity of organic isocyanates containing hydrolyzable chlorides may be increased by mixing with the organic isocyanate an amount of N,N-disubstituted carbamyl chloride sufficient to increase hydrolyzable chlorine content of the isocyanate in an amount of from about 10 to 100 parts, preferably 20 to 50 parts, hydrolyzable chlorine per million of organic isocyanate when analyzed by ASTM Method D–1638–67T, Sections 39–46, for "Hydrolyzable Chlorine."

It is taught in the prior art that adjusting hydrolyzable chlorine by adding anhydrous hydrogen chloride reduces the reactivity of organic isocyanates. Accordingly, it is very surprising that the addition of the N,N-disubstituted carbamyl chlorides, i.e., those derived from secondary amines as opposed to those which would be derived from primary amines, increases the reactivity or reaction rate of an isocyanate group with the reactive hydrogen atom. Thus, contrary to the obvious conclusion which would normally be reached from the teaching of the prior art, increasing the hydrolyzable chlorine level as determined by the above referred to ASTM Method D–1638–67T using the secondary amine carbamyl chlorides increases the reactivity of the isocyanate.

It is to be understood that the synthesis of the organic isocyanate does not form a part of this invention. In a suitable method of preparing organic isocyanates, the corresponding amine or amine salts are reacted with phosgene in the manner known in the art. The phosgenation procedure is generally utilized in the preparation of isocyanates because of the economy of the method and the resulting superior yields obtained. A particularly suitable method of preparing an organic isocyanate is set forth in U.S. Pat. 3,014,942.

This invention may be performed by simply mixing the N,N-disubstituted carbamyl chloride with the organic isocyanate at ambient temperature and pressure.

The quantity of the particular N,N-disubstituted carbamyl chloride compound used for treating the organic isocyanates depends on the amount of hydrolyzable chlorine and acidic containing substituents present in the particular isocyanate. However, an amount of N,N-disubstituted carbamyl chloride sufficient to add from about 10 to 100 parts hydrolyzable chlorine per million of the organic isocyanate is usually sufficient to provide a significant or desired improvement in reactivity with reactive hydrogen atoms.

The method of the instant invention is particularly applicable to the production of alkaryl and aryl di- and polyisocyanates. Illustrative examples are 2,4-toluene diisocyanate, 2,6-toluene diisocyanate and mixtures of 2,4- and 2,6-toluene diisocyanate, 4,4'-diphenylmethane diisocyanate, 4,4'-diphenylpropane diisocyanate, p-isocyanato benzyl isocyanate, m-phenylene diisocyanate, p-phenylene diisocyanate, naphthylene - 1,4 - diisocyanate, naphthylene-1,5-diisocyanate, 1,2,4-benzene triisocyanate, p,p',p''-tri-phenylmethane triisocyanate, diphenyl-4,6',4'-triisocyanate and the like.

The N,N-disubstituted carbamyl chlorides which have been found particularly useful are diethyl carbamyl chloride, dipropyl carbamyl chloride, dibutyl carbamyl chloride, diisobutyl carbamyl chloride, di-n-hexyl carbamyl chloride, di-cyclohexyl carbamyl chloride, methyl octyl carbamyl chloride, methyl phenyl carbamyl chloride, methyl tolyl carbamyl chloride, propyl xylyl carbamyl chloride, indolin carbamyl chloride, diphenyl carbamyl chloride, phenyl tolyl carbamyl chloride, 1,2,3,4-tetrahydroquinoline carbamyl chloride, morpholine carbamyl chloride, 2-methyl morpholine carbamyl chloride, piperidine carbamyl chloride, pyrrolidine carbamyl chloride, piperazine-bis-carbamyl chloride, 1,2,3,4-tetrahydroquinoxaline-bis-carbamyl chloride.

Organic isocyanates treated in accordance with this invention are useful in the preparation of cellular polyurethane materials as well as the elastomeric materials. Cellular polyurethanes are useful for manufacturing cushions, upholstering units of all types and for sound and weather insulation purposes. Elastomeric polyurethanes are useful for the manufacture of vehicle tires, gears, shafts, couplings, diaphragms, and many other applications.

This invention may be further illustrated by the following examples in which parts are given by weight unless otherwise specified.

EXAMPLE I

This example illustrates the preparation of a polyurethane foam from the following prior art formulation for purposes of comparison:

100 parts by weight 3500 mol. wt. polyoxypropylene glycerine initiated triol
2 parts by weight water
1.2 parts by weight silicone surfactant
1.3 parts by weight tertiary amine catalyst
117 index toluene diisocyanate
0.18 parts by weight stannous octoate (stabilized)

For the preparation of polyurethane foam, a Hennecke UBT–63 foam machine was mounted above a conveyor belt moving at a speed of 7.5 feet per minute which conveyed the foam through a heated tunnel after the foam rise was completed. The tunnel was 15 feet long and heated with infrared tubular heaters.

In the above formulation, the silicone surface active agent was silicone glycol cell control additive sold by Dow Corning under the designation Dow Corning 190, described in Bulletin No. 05–128, published by Dow Corning, Midland, Mich., June 1965.

The tertiary amine catalyst was a 2:1 weight mixture of N-ethyl morpholine and Niax A–1 catalyst [bis(dimethylaminoethyl)ether].

The toluene diisocyanate was a commercial product which was an 80/20 mixture of 2,4-/2,6- mixed isomers of toluene diisocyanate which was found by ASTM Method D–1638–67T to contain 30 parts per million acidity and 30 parts per million hydrolyzable chlorine.

The cream line of the deposited foam (which indicates the initial reaction) was 15 inches from the mixing head. The top and sides of the foam bun remained sticky to the touch for more than 15 minutes after emerging from the heated section of the tunnel.

EXAMPLE II

The formulation and procedure of Example I was employed with the exception that 0.014 part of methyl phenyl carbamyl chloride per 100 parts toluene diisocyanate (equivalent to 30 parts per million of hydrolyzable chlorine as determined by ASTM Method D–1638–67T) were included in the formulation which was mixed in the foam machine. The cream line was 13 inches from the mixing head and the top and sides of the foam bun were dry to the touch as it emerged from the heated section of the tunnel, thus demonstrating that the methyl phenyl carbamyl chloride substantially improved the reaction rate of the toluene diisocyanate with polyoxypropylene triol in the production of the urethane foam.

EXAMPLE III

The formulation and procedure of Example I was employed with the exception that 0.0165 part of dibutyl carbamyl chloride per 100 parts of toluene diisocyanate (equivalent to the addition of 30 parts per million hydrolyzable chlorine as determined by the ASTM D–1638–67T Test) were included in the formulation that was mixed in the foam machine. The cream line obtained was 12 inches from the mixing head and the foam bun was tack-free upon emerging from the heated section of the tunnel, thus demonstrating the greatly improved reaction rate between the toluene diisocyanate and the polyoxypropylene triol as a result of the inclusion of the dibutyl carbamyl chloride.

EXAMPLE IV

The formulation and procedure of Example I is employed with the exception that 585 parts of diphenyl carbamyl chloride per 100 parts of toluene diisocyanate (equivalent to addition of 90 parts per million hydrolyzable chlorine) are included in the formulation which is mixed in the foam machine and 103 parts of 3600 mol weight trimethylolpropane initiated polyoxypropylene triol with a 6% polyoxethylene cap are substituted for the polyoxypropylene triol. The reactivity and cure rate are substantially improved.

EXAMPLE V

The formulation and procedure of Example I is employed with the exception that 84.5 parts of morpholine carbamyl chloride per 100 parts of toluene diisocyanate (equivalent to addition of 20 parts per million hydrolyzable chlorine) are included in the formulation which is mixed in the foam machine and 103 parts of the polyol used in Example IV are substituted for the polyoxypropylene triol. The reactivity and cure rate are substantially improved.

EXAMPLE VI

The formulation and procedure of Example I is employed with the exception that 250 parts of piperidine carbamyl chloride per 100 parts of toluene diisocyanate (equivalent to addition of 60 parts per million hydrolyzable chlorine) are included in the formulation which is mixed in the foam machine and 100 parts of 3500 mol weight glycerine initiated polyoxyethylene polyoxypropylene triol are substituted for the polyoxypropylene triol. The reactivity and cure rate are substantially improved.

It is to be distinctly understood that various changes and modifications may be made in the foregoing without departing from the spirit of the invention and scope of the appended claims.

What is claimed is:

1. A method of increasing the reactivity of organic isocyanates selected from the group consisting of alkyl aryl, poly aryl, aryl alkyl, polyisocyanates wherein the aryl group may be phenyl or naphthyl and the alkyl group may be methyl or propyl, containing hydrolyzable chlorides which comprises mixing with the organic isocyanate an amount of N,N-disubstituted carbamyl chloride prepared from secondary amines selected from the group consisting of alkyl, aryl, heterocyclic and bicyclic amines wherein the alkyl groups may be methyl, ethyl, propyl, butyl, hexyl, octyl and dodecyl, sufficient to increase the hydrolyzable chlorine in an amount of from about 10 to 100 parts hydrolyzable chlorine per million of organic isocyanate.

2. The process of claim 1 wherein said organic isocyanate is toluene diisocyanate.

3. The process of claim 2 wherein said N,N-disubstituted carbamyl chloride is employed in an amount to increase the hydrolyzable chlorine by 20 to 50 parts hydrolyzable chlorine per million of toluene diisocyanate.

4. A composition of matter consisting essentially of an organic isocyanate selected from the group consisting of alkyl aryl, poly aryl, aryl alkyl, polyisocyanates wherein the aryl group may be phenyl or naphthyl, and the alkyl group may be methyl or propyl, and an amount of N,N-disubstituted carbamyl chloride prepared from secondary amines selected from the group consisting of alkyl, aryl, heterocyclic and bicyclic amines wherein the alkyl groups may be methyl, ethyl, propyl, butyl, hexyl, octyl and dodecyl, sufficient to add from about 10 to 100 parts by weight hydrolyzable chlorine per million of organic isocyanate.

5. The composition of claim 4 wherein said isocyanate is toluene diisocyanate.

6. The composition of claim 5 wherein the amount of N,N-disubstituted carbamyl chloride is sufficient to add from about 20 to 50 parts hydrolyzable chlorine per million of toluene diisocyanate.

References Cited

UNITED STATES PATENTS

| 2,908,703 | 10/1959 | Latourette et al. | 260—453 A |
| 3,184,494 | 5/1965 | Maeda et al. | 260—453 A |
| 3,215,652 | 11/1965 | Kaplan | 260—453 A |

OTHER REFERENCES

Advanced Organic Chemistry, R. C. Fuson, Wiley & Sons, 1950, p. 529.

RICHARD D. LOVERING, Primary Examiner

I. GLUCK, Assistant Examiner

U.S. Cl. X.R.

260—453 A